United States Patent [19]

Somlo

[11] 3,904,602

[45] Sept. 9, 1975

[54] PROCESS FOR THE MANUFACTURE OF TETRASUBSTITUTED UREAS

[75] Inventor: Tibor Somlo, Birsfelden, Switzerland

[73] Assignee: Ciba-Geigy Corporation, Ardsley, N.Y.

[22] Filed: Feb. 11, 1972

[21] Appl. No.: 225,625

[30] Foreign Application Priority Data

Feb. 16, 1971 Switzerland.......................... 2247/71
Jan. 20, 1972 Switzerland........................... 824/72

[52] U.S. Cl. .... 260/239 E; 260/239 BF; 260/246 B; 260/247.2 A; 260/293.63; 260/293.76; 260/326.25; 260/326.4; 260/553 R; 260/553 A

[51] Int. Cl.² ..................................... C07D 203/00

[58] Field of Search..... 260/553 R, 553 A, 247.2 A, 260/293.63, 246 B, 326.4, 326.25, 239 E, 239 BF, 293.76

[56] References Cited
UNITED STATES PATENTS

| | | | |
|---|---|---|---|
| 2,659,747 | 11/1953 | Young | 260/461 |
| 3,555,086 | 1/1971 | Weis et al. | 260/553 R |
| 3,714,217 | 1/1973 | Sturm et al. | 260/553 R |

*Primary Examiner*—Donald G. Daus
*Assistant Examiner*—Jose Tovar
*Attorney, Agent, or Firm*—Joseph G. Kolodny; Prabodh I. Almaula; Edward McC. Roberts

[57] ABSTRACT

A process for the manufacture of N,N,N',N'-tetrasubstituted ureas of the general formula

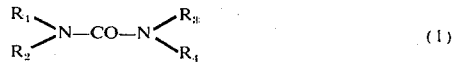

in which $R_1$ to $R_4$ each represent an alkyl radical, with $R_1$ and $R_2$ and $R_3$ and $R_4$ in each case together with the nitrogen atom to which they are bonded, being able to form a heterocyclic ring which may optionally contain further hetero atoms, wherein N,N-disubstituted carbamic acid halides of the formula

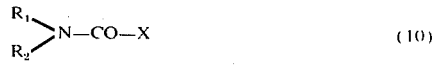

in which $R_1$ and $R_2$ have the meaning given above and X represents a halogen atom, especially chlorine or bromine are reacted with a secondary amine and an inorganic base, preferably anhydrous ammonia and the new N,N,N',N'-tetrasubstituted ureas.

9 Claims, No Drawings

PROCESS FOR THE MANUFACTURE OF TETRASUBSTITUTED UREAS

The present invention relates to tetrasubstituted ureas of the general formula

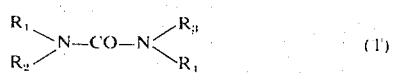

wherein $R_1$ to $R_4$ each represent an alkyl radical with $R_1$ and $R_2$ and $R_3$ and $R_4$ in each case, together with the nitrogen atom to which they are bonded, being able to form a heterocyclic ring which optionally contains further hetero atoms, for example oxygen, sulphur or nitrogen atoms.

The alkyl radicals $R_1$ to $R_4$ may contain a smaller or greater number of carbon atoms; they may be straight-chain or branched. They may also contain aryl radicals, for example a benzyl radical. Compounds to which interest attaches are primarily those of the formula (1), in which $R_1$ to $R_4$ are alkyl radicals containing from 1 to 18 carbon atoms. Where $R_1$ and $R_2$ and $R_3$ and $R_4$ in each case together with the nitrogen atom to which they are bonded form a heterocyclic ring, compounds of the formula

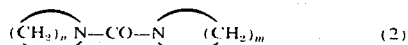

or "mixed" ureas of the formula

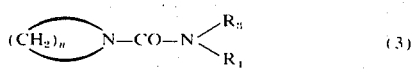

are preferred, in which n and m are positive integers from 2 to 6 and $R_3$ and $R_4$ each represent an alkyl radical. Compounds of the formulae (2) and (3) may contain, for example, aziridine, pyrrolidine, piperidine or hexamethyleneimine radicals bonded to the carbonyl bridge. If the heterocyclic ring formed by $R_1$ and $R_2$ and $R_3$ and $R_4$ in each case together with the nitrogen atom to which they are bonded contains a further heteroatom in addition to the nitrogen atom, suitable compounds are primarily those of the formulae

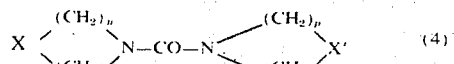

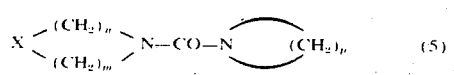

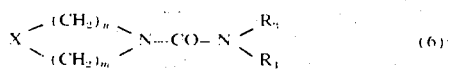

wherein X and X' each represent an oxygen or sulphur atom or an —NR group, in which R is a hydrogen atom or an alkyl radical, $R_3$ and $R_4$ have the meaning given hereinabove and n, m, p and q represent positive integers which are small, n and m and p and q preferably being equal. As important compounds of the formulae (4) to (6) there may be cited those which contain a 5- or 6-membered heterocyclic radical containing one or two heteroatoms, in particular a radical of the formula

wherein X has the meaning given hereinabove. The morpholino radical may be cited as a example of radical of the formula (7).

The present invention relates also to a process for the manufacture of the tetrasubstituted ureas described hereinabove.

The tetrasubstituted ureas may be manufactured according to various methods.

The method generally employed is the reaction of N,N-disubstituted carbamic acid halides with secondary amines and which proceeds according to the equation

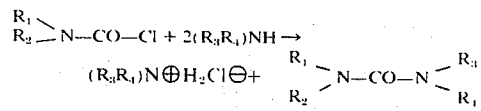

The disadvantages of this process are that 2 mols of amine are required to manufacture 1 mol of urea, that the pronounced heat effect of the reaction is technically difficult to control, and that, in certain circumstances, it is difficult to isolate the resulting urea from the salts that have formed. Other known methods likewise have disadvantages, for example the formation of troublesome by-products or an undesirable consumption of additional and possibly expensive reactants.

The discovery has now been made that it is possible to manufacture tetrasubstituted ureas by a method which does not possess the disadvantages of the known methods. This process constitutes a development of a process we have discovered for the manufacture of N,N-disubstituted carbamic acid halides.

The process according to the invention consists in reacting an N,N-disubstituted carbamic acid halide, in particular a chloride, of the formula

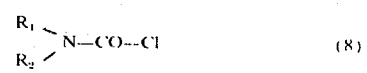

with a secondary amine of the formula

and a base, in particular anhydrous ammonia without solvent, in the tetrasubstituted urea to be manufactured as solvent, or in concentrated aqueous solution, preferably between about −20°C and +120°C.

The reaction proceeds, for example, according to the empirical equations

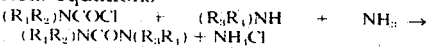

or

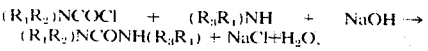

so that 1 mol of urea is obtained for each mol of carbamic chloride. The only by-products which occur are inorganic salts and possibly water.

The suitability of ammonia as acid binding agent is particularly surprising, for the dialkylcarbamic chlorides react both with aliphatic amines and with ammonia. The surprising discovery has now been made that the dialkylcarbamic chlorides, in the presence of ammonia and secondary aliphatic amines, react selectively only with the latter.

The dialkylcarbamic chloride, which is prepared from dialkylamine and phosgene, is advantageously reacted in a first reaction step with an approximately equivalent amount of dialkylamine, and the mixture is treated in a second step with ammonia. The ammonia is advantageously introduced in gaseous form. The reaction may be illustrated as follows:

earth hydroxides and carbonates, or ammonium hydroxide. Preferably in this case also the reaction takes place continuously. On account of the pronounced heat effect, it is advisable to use a reaction vessel which permits a good heat exchange. The process is preferably carried out at low temperatures, from about −20°C to + 20°C. The secondary amine and the base may be added simultaneously and continuously to the carbamic chloride. Subsequent upon the reaction, the water contained in the reaction solution is distilled off continuously and the tetrasubstituted urea formed is

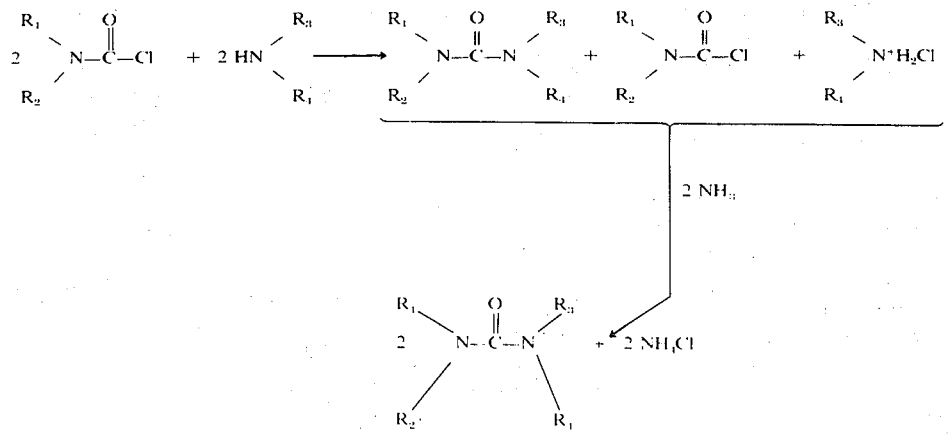

The process is preferably carried out at 40°C to 70°C. The ammonium chloride is precipitated quantitatively in the form of coarse crystals. The ammonia gas introduced in the second step does not react with the free dialkylcarbamic chloride present, but liberates the dialkylamine from its salt, whereupon this latter reacts with the dialkylcarbamic chloride. No dialkyl urea is formed. The reaction is generally carried out in a closed system; and the completion of the reaction is detected by no more ammonia gas being taken up (signalled by a rise in pressure in the reaction vessel). It is also possible to treat the carbamic chloride simultaneously with dialkylamine and ammonia.

Upon completion of the reaction, the mixture is allowed to cool to room temperature and the urea is isolated by filtration from the crystalline ammonium chloride. It is possible to isolate a further amount of urea by extracting the ammonium chloride residue with solvents, such as methylene chloride, benzene, toluene etc. and concentrating the extracts. Yields of over 95% of theory are obtained in this manner.

The use of anhydrous ammonia as acid binding agent offers particular advantages: the heat effect of the reaction is easily controllable, since the formation of ammonium chloride is less exothermic than that of water if sodium hydroxide, for example, is used as base. Moreover, the processing of the reaction mixture is very simple, since it is necessary to isolate only the ammonium chloride occurring in the form of coarse crystals and no water need be distilled off. Preferably the reaction takes place continuously, and virtually pure tetrasubstituted urea is obtained.

Instead of anhydrous ammonia, it is also possible to use as acid binding agents bases differing from the dialkyl amine used, in particular inorganic bases, for example alkali hydroxides, especially concentrated aqueous sodium hydroxide solution, alkali carbonates, alkaline earth hydroxides and carbonates, or ammonium hydroxide.

filtered off from precipitated alkali or alkaline earth chloride.

The resulting product is the practically pure urea derivative. The reaction is carried out at a pH between about 9 and 11.5, preferably between 10 and 11.

Examples of suitable starting materials for the process according to the invention are:
N,N-disubstituted carbamic chlorides
N,N-dimethylcarbamic chloride,
N,N-diethylcarbamic chloride,
N,N-diisobutylcarbamic chloride,
N,N-diisoamylcarbamic chloride,
N,N-diisoheptylcarbamic chloride,
pyrrolidinocarbamic chloride,
piperidinocarbamic chloride,
morpholinocarbamic chloride,
N,N-dibenzylcarbamic chloride,
N-methyl-N-ethylcarbamic chloride,
N-methyl-N-cyclohexylcarbamic chloride.

Secondary amines:
dimethylamine, diethylamine, dibutylamine, diisobutylamine, methyl-ethylamine, diisoamylamine, diisoheptylamine, pyrrolidine, piperidine, morpholine, dibenzylamine, methyl-cyclohexylamine etc.

Instead of the chlorides cited hereinabove, it is also possible to use other halides of N,N-disubstituted carbamic acids, for instance bromides.

The process according to the invention may be advantageously combined with the process which has already been mentioned for the manufacture of N,N-disubstituted carbamic acid halides.

In this process, N,N-disubstituted carbamic chlorides of the formula

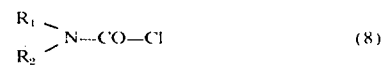

are obtained in very good yield by reacting a secondary amine of the formula $(R_1R_2)NH$ with phosgene in high boiling solvents, or, preferably, in the carbamic chloride to be manufactured itself as solvent, at elevated temperature (between about 60°C and 160°C), preferably at 80°C to 95°C. The amine and the phosgene are advantageously added together simultaneously and continuously, the phosgene being present in an excess of 5 to 10% conditioned by factors relating to the technical apparatus used. Preferably, the process is carried out continuously. The reaction takes place in a reaction vessel equipped with stirrer and in which there is present a solvent, or preferably the desired carbamic chloride from a previous batch as solvent. On simultaneously running in the amine and introducing the phosgene, the reaction proceeds of its own accord at corresponding temperature. The carbamic chloride formed is continuously discharged into a second vessel. The resulting crude product is sufficiently pure to enable it to be used without further processing for the reaction with a secondary amine to give the tetrasubstituted urea.

The N,N-disubstituted carbamic chloride which occurs in the manner described can now — likewise continuously — be passed into a second reaction vessel in which it is reacted with a secondary amine. The reaction mixture obtained can then be treated with ammonia gas in a third reactor. The viscous suspension is centrifuged or thoroughly filtered with suction under vacuum. The filtrate consists of practically pure tetrasubstituted urea. The introduction of gaseous secondary amine or gaseous ammonia takes place in a closed system, preferably under slight overpressure (20 to 40 mm Hg).

On using bases other than anhydrous ammonia, the N,N-disubstituted carbamic chloride manufactured in the manner described may be conveyed in turn to a reaction vessel into which the secondary amine and the required amount of base, for example sodium hydroxide, are introduced simultaneously. The pH of the reaction solution is kept at the required value by the addition of sodium hydroxide solution, and a severe cooling ensures that the reaction temperature does not exceed 20°C. A solution which consists of the desired tetrasubstituted urea, sodium chloride and water may be withdrawn continuously from this reaction vessel. As already mentioned, it is possible to distill off the water under normal pressure and the precipitated sodium chloride can be isolated by filtration from the filtrate, which consists of virtually pure tetrasubstituted urea.

The tetrasubstituted ureas according to the invention are used in preparative organic chemistry as reactants, for example as chlorination catalysts and particularly as solvents in various reactions (see also Angew. Chemie, 75, 1059 (1963). However, their industrial use has hitherto been limited on account of the known complicated and expensive manufacturing processes. The present process now makes such urea compounds readily available and thus permits their advantageous properties to be used also for industrial processes.

The following Examples illustrate the invention, the parts and percentages being by weight unless otherwise stated.

EXAMPLE 1

350 Parts (about 300 ml) of dimethylcarbamic chloride are introduced initially into a reaction vessel of 350 ml capacity, and 60 parts of dimethylamine gas and 140 parts of phosgene are introduced beneath the surface simultaneously and regularly per hour at 85°C to 95°C, with stirring. The dimethylcarbamic chloride which has formed flows continuously into the second reaction vessel, into which a further 63 parts of dimethylamine gas are steadily passed in simultaneously per hour. By simultaneously adding about 54 parts of 100% sodium hydroxide solution (in the form of about 40% solution) per hour the pH in the second reaction vessel is kept at 10.5 to 11.5, and the reaction temperature kept below 20°C by intense cooling. Through the outlet of the second reaction vessel there flow per hour about 310 parts of a solution of the following composition: app. 47% tetramethyl urea, appl. 27% water, app. 26% sodium chloride.

The water is distilled off from this solution at normal pressure and the crystallised sodium chloride filtered off. The filtrate is virtually pure tetramethyl urea, which occurs in purity of over 99% and in a yield of 95% (relative to the amount of dimethylamine used).

Boiling point at 10 mm Hg: 62°C; refractive index at 20°: 1.4500 ( = $n_D^{20}$).

EXAMPLE 2

1075 Parts of dimethylcarbamic chloride are introduced initially into a reaction vessel of 1500 ml capacity and 450 parts of dimethylamine gas are passed in at 50°–60°C with stirring. The gas is introduced in a closed system, in the process of which a slight overpressure (20–40 mm Hg) should be present. Subsequently 175 parts of ammonia gas are passed into the reaction mixture. At the conclusion of the reaction, no more ammonia is taken up, so that the pressure in the closed system increases. Stirring is continued for half an hour, the thick suspension cooled to 20°C and thoroughly filtered with suction or centrifuged. The filtrate consists of 1050 parts of virtually pure tetramethyl urea. It is possible to extract a further 60 parts of tetramethyl urea from the ammonium chloride filter cake with a solvent, for example methylene chloride, toluene etc. Calculated on the amount of dimethylcarbamic chloride used, the yield thus amounts to 96% of theory.

EXAMPLE 3

322.5 Parts of dimethylcarbamic chloride are introduced initially into a reaction vessel of 1500 ml capacity and 45 parts of dimethylamine gas and 108 parts of phosgene are passed in per hour beneath the surface simultaneously and regularly at 85°–90°C with stirring, until a total of 315 parts of dimethylamine gas and 756 parts of phosgene have been passed in within 7 hours. The mixture is then cooled to 50°C and a further 450 parts of dimethylamine gas are passed in at 50°–60°C with stirring. The gas is introduced in a closed system, when a slight overpressure (20–40 mm Hg) should constantly be present in the reaction vessel. Subsequently, and likewise in a closed system, a further 175 parts of ammonia are passed in. At the conclusion of the reaction, no more ammonia is taken up and the pressure increases. The viscous suspension is cooled to 20°C and thoroughly filtered with suction or centrifuged. The filtrate consists of 1050 parts of virtually pure tetramethyl urea.

EXAMPLE 4

350 Parts (app. 300 ml) of dimethylcarbamic chloride are introduced initially into a reaction vessel of 350 ml capacity and 60 parts of dimethylamine gas and 140 parts of phosgene are passed in simultaneously and regularly per hour at 85°C to 90°C with stirring. The dimethylcarbamic chloride which has formed discharges continuously into two consecutively connected reaction vessels. In the first reaction vessel, the dimethylcarbamic chloride is reacted in counter current with 60 parts of dimethylamine per hour; and in the second reaction vessel, with 24 parts of ammonia gas per hour. The viscous suspension which leaves the second reaction vessel is centrifuged. The filtrate consists of virtually pure tetramethyl urea. In this manner, 145 parts of tetramethyl urea are obtained per hour, corresponding to a yield of 93.5% of theory, calculated on the amount of dimethylamine used.

If in Example 2 the dimethylamine gas is replaced by an equivalent amount of diethylamine, pyrrolidine or morpholine, the following unsymmetric tetrasubstituted ureas are formed:

| Example | Amine | Product | Boiling Point |
|---|---|---|---|
| Example 5 | $NH(C_2H_5)_2$ | 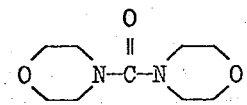 | b.p.₁₂ 74–75 |
| Example 6 | 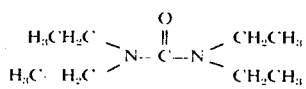 | | b.p.₀.₀₆ 55 |
| Example 7 | 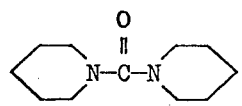 | | b.p. |

EXAMPLE 8

If in Examples 1, 3 and 4, 162 parts of diethylamine are used instead of 100 parts of dimethylamine and the corresponding carbamic chloride is used as solvent, tetra-ethyl urea of the formula $$H_3CH_2C\!\!-\!\!N\!-\!\overset{O}{\overset{\|}{C}}\!-\!N\!\!-\!\!CH_2CH_3$$
$$H_3C\;H_2C\qquad\qquad\quad CH_2CH_3$$

is obtained.

Boiling point at 12 mm Hg: 94°–95°C; yield 95% of theory.

EXAMPLE 9

Di-piperidyl urea

If in Examples 1, 3 and 4, 189 parts of piperidine are used instead of 100 parts of dimethylamine and the corresponding carbamic chloride is used as solvent, dipiperidyl urea of the formula

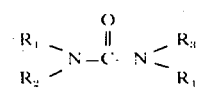

is obtained.

Boiling point at 13 mm Hg: 152°–154°C; melting point: 42°–43°C.

EXAMPLE 10

If in Example 1 there are used 100 parts of morpholine instead of 100 parts of dimethylamine and morpholinocarbamic chloride is used as solvent, dimorpholino urea of the formula

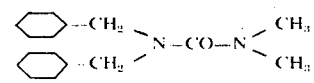

is obtained. On account of the relatively high melting point, the processing of this product differs from Example 1.

The reaction mixture which contains water and salt is extracted repeatedly with toluene and the toluene solutions are then concentrated. The dimorpholino urea crystallises from the toluene. Melting point: 140°–142°C.

EXAMPLE 11

If in Examples 1, 3 and 4, the dimethylamine introduced into the second reaction vessel is replaced by an equivalent amount of dibenzylamine, the unsymmetric N,N-dimethyl-N',N'-dibenzyl urea of the formula $$\begin{array}{c}\phi-CH_2\\ \phi-CH_2\end{array}\!\!N-CO-N\!\!\begin{array}{c}CH_3\\ CH_3\end{array}$$

is obtained. Boiling point at 0.3 mm Hg: 162°–165°C.

I claim:

1. A process for the manufacture of a N,N,N',N',-tetrasubstituted urea of the formula $$\begin{array}{c}R_1\\ R_2\end{array}\!\!N-\overset{O}{\overset{\|}{C}}-N\!\!\begin{array}{c}R_3\\ R_4\end{array}$$

wherein $R_1$, $R_2$, $R_3$ and $R_4$ are benzyl or alkyl of 1 to 18 carbon atoms, or R1 and R2 or R3 and R4 form, together with the nitrogen atom, aziridino, pyrrolidino, piperidino, hexamethyleneimino or morpholino, comprising the steps of treating a N,N-disubstituted carbamic acid halide of the formula: $(R_1)(R_2)NCOX$, wherein X is chlorine or bromine, with a secondary amine of the formula: $(R_3)(R_4)NH$, and then with anhydrous ammonia.

2. A process for the manufacture of N,N,N',N'-tetrasubstituted urea of the formula

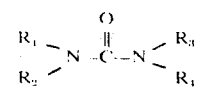

wherein $R_1$, $R_2$, $R_3$ and $R_4$ are benzyl or alkyl of 1 to 18 carbon atoms, comprising the steps of treating, (a) in a first step a N,N-disubstituted carbamic acid halide of the formula: $(R_1)(R_2)NCOX$, wherein X is chlorine or bromine, with a secondary amine of the formula: $(R_3)(R_4)NH$, and (b) in a second step the resulting reaction mixture with anhydrous ammonia.

3. The process of claim 2, wherein the treatment is carried out under pressure at a temperature in the range of $-20°$ to $+120°C$.

4. The process of claim 2, wherein X is chlorine, the treatment is carried out at 40°C to 70°C.

5. The process of claim 2, wherein $R_1$, $R_2$, $R_3$ and $R_4$ are identical.

6. The process of claim 4, wherein $R_1$, $R_2$, $R_3$ and $R_4$ are identical.

7. The process of claim 5, wherein $R_1$, $R_2$, $R_3$ and $R_4$ are methyl.

8. The process of claim 2, wherein the treatment is carried out in the absence of solvent or in the N,N,N',N',-tetrasubstituted urea being manufactured.

9. The process of claim 4, wherein the treatment is carried out in the absence of solvent or in the N,N,N',N'-tetrasubstituted urea being manufactured.

* * * * *